(12) United States Patent
An

(10) Patent No.: US 11,447,351 B2
(45) Date of Patent: Sep. 20, 2022

(54) IMAGE FORMING APPARATUS AND IMAGE FORMING METHOD

(71) Applicant: Hewlett-Packard Development Company, L.P., Spring, TX (US)

(72) Inventor: Byung Sik An, Seongnam-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 327 days.

(21) Appl. No.: 16/639,323

(22) PCT Filed: May 10, 2018

(86) PCT No.: PCT/KR2018/005337
§ 371 (c)(1),
(2) Date: Feb. 14, 2020

(87) PCT Pub. No.: WO2019/059486
PCT Pub. Date: Mar. 28, 2019

(65) Prior Publication Data
US 2021/0032056 A1    Feb. 4, 2021

(30) Foreign Application Priority Data
Sep. 21, 2017   (KR) .......................... 10-2017-0121588

(51) Int. Cl.
*B65H 7/02*    (2006.01)
*G03G 15/00*   (2006.01)
*B65H 5/06*    (2006.01)
*H04N 1/00*    (2006.01)

(52) U.S. Cl.
CPC ............... *B65H 7/02* (2013.01); *B65H 5/062* (2013.01); *G03G 15/50* (2013.01); *G03G 15/5008* (2013.01); *G03G 15/80* (2013.01); *B65H 2513/10* (2013.01); *B65H 2515/704* (2013.01); *B65H 2515/805* (2013.01); *H04N 1/00655* (2013.01)

(58) Field of Classification Search
CPC .... G03G 15/00; G03G 15/50; G03G 15/5008; G03G 15/80; B65H 5/06; B65H 5/062; B65H 7/02; B65H 2511/13; B65H 2513/10; B65H 2515/32; B65H 2515/40; B65H 2515/704; B65H 2515/805; H04N 1/00655; H02P 8/14; H02P 29/40
See application file for complete search history.

(56) References Cited

U.S. PATENT DOCUMENTS

| | | | |
|---|---|---|---|
| 10,277,152 B2 * | 4/2019 | Nito | ........................ G03G 15/50 |
| 2004/0169486 A1 | 9/2004 | Akiwa | |
| 2011/0229235 A1 | 9/2011 | Tachibana et al. | |
| 2014/0205340 A1 | 7/2014 | Yamaguchi et al. | |
| 2014/0333250 A1 | 11/2014 | You et al. | |

FOREIGN PATENT DOCUMENTS

JP    2008-236940 A    10/2008

* cited by examiner

Primary Examiner — Sophia S Chen
(74) Attorney, Agent, or Firm — Jefferson IP Law, LLP

(57) ABSTRACT

An image forming apparatus is provided. The image forming apparatus includes an engine unit to be used for performing an image forming job, a motor to start the engine unit, a driver circuit to sense a current flowing in the motor and supply the motor with a power source, and a processor to determine a load size of the motor based on the sensed current and control a driving speed of the motor based on the determined load size.

18 Claims, 6 Drawing Sheets

[Fig. 1]
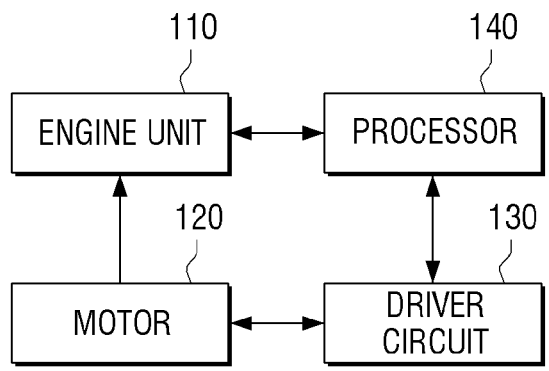
[Fig. 2]
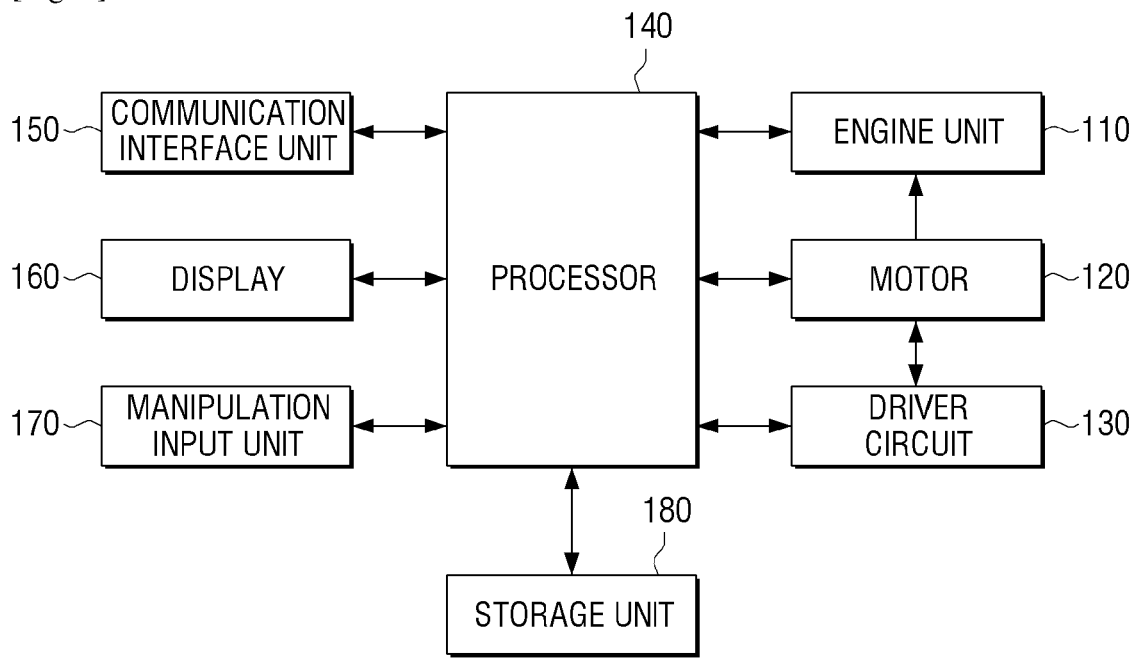

[Fig. 3]
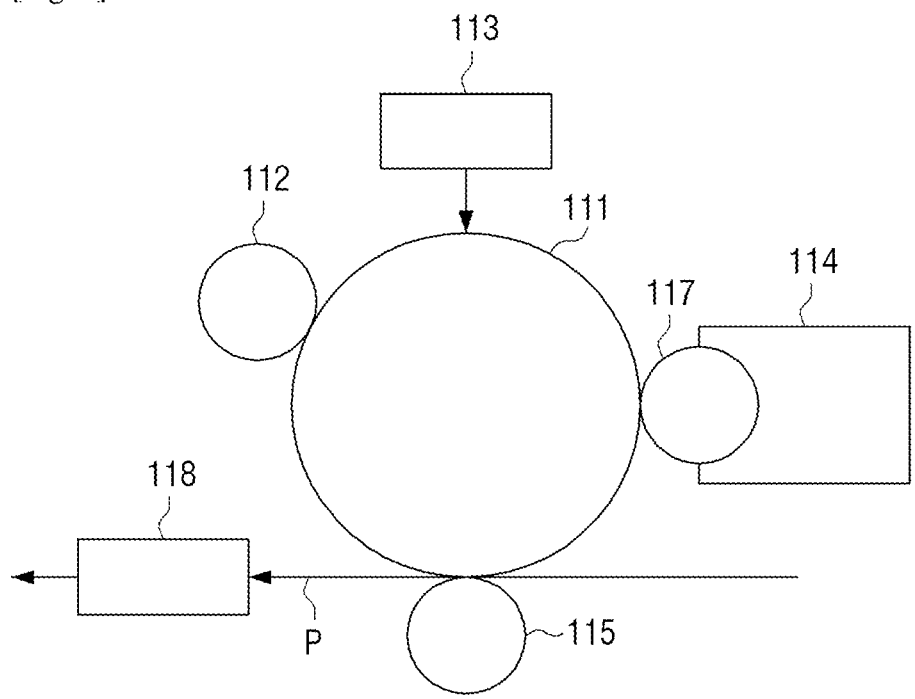
[Fig. 4]
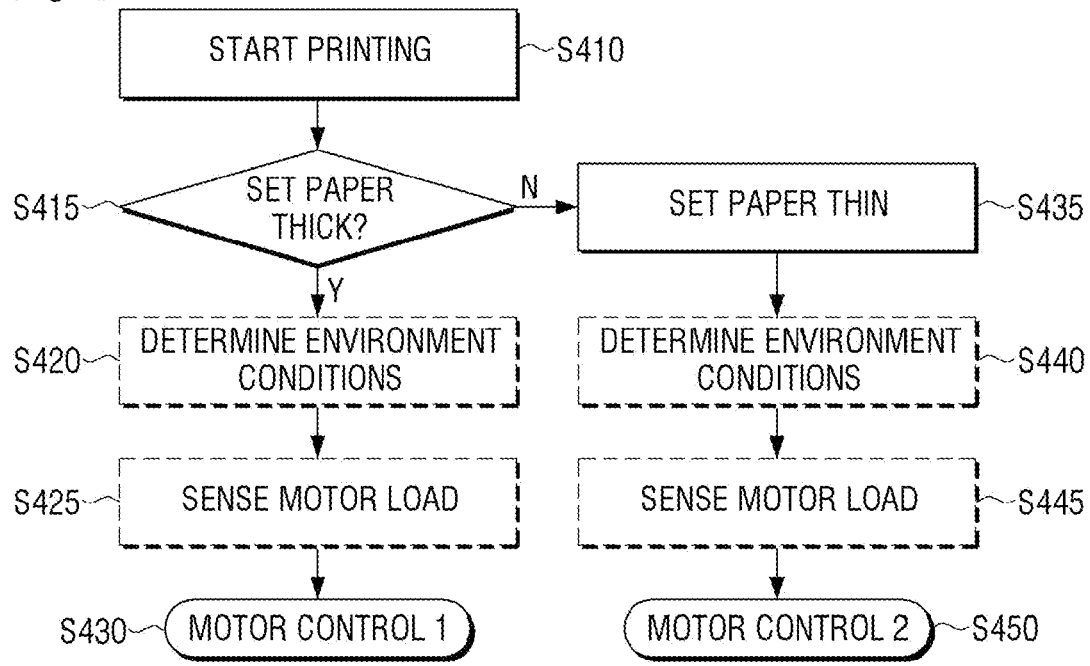

[Fig. 5]
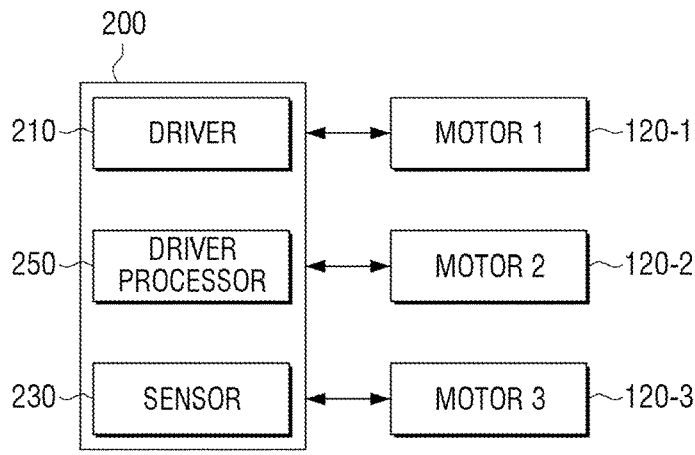
[Fig. 6]
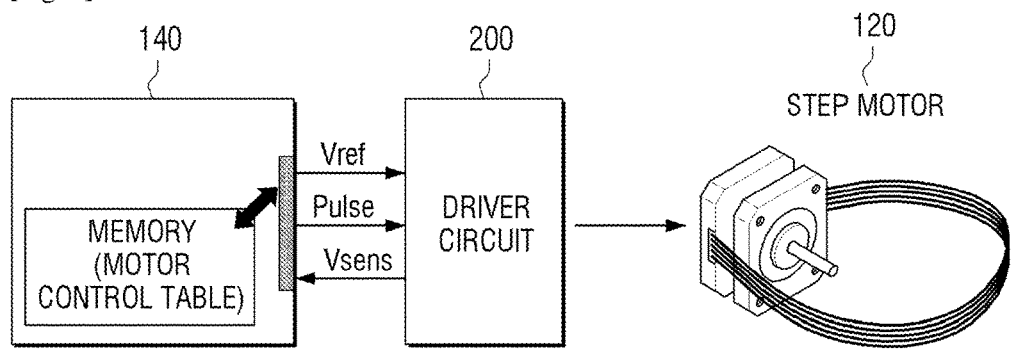
[Fig. 7]
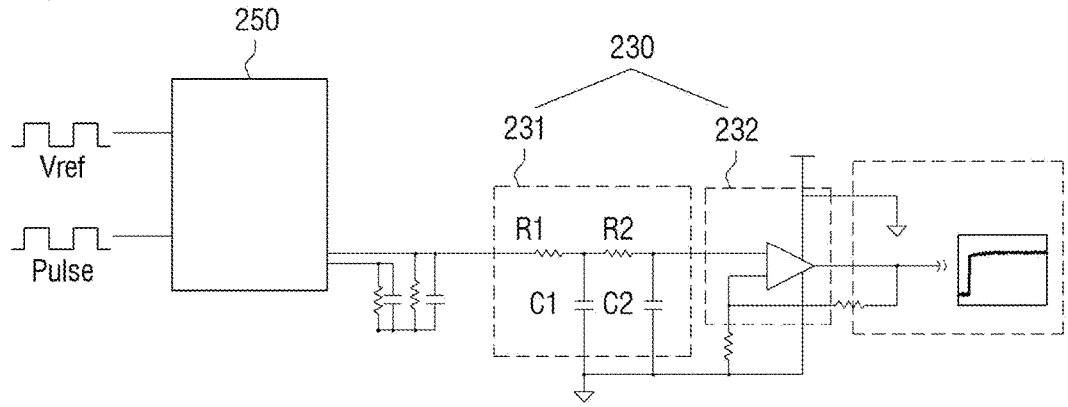
[Fig. 8]
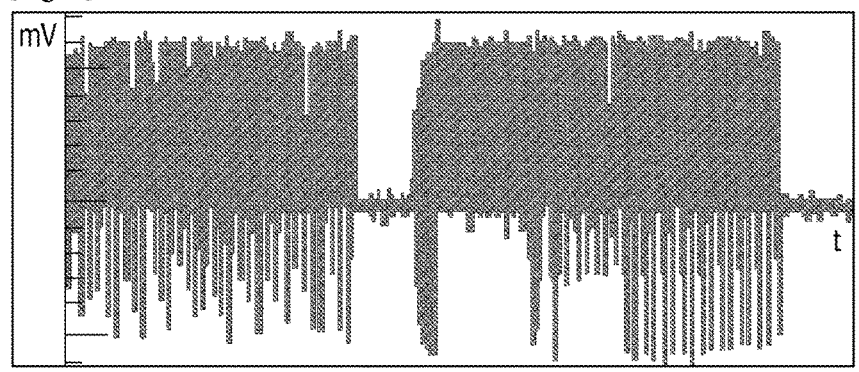

[Fig. 9]
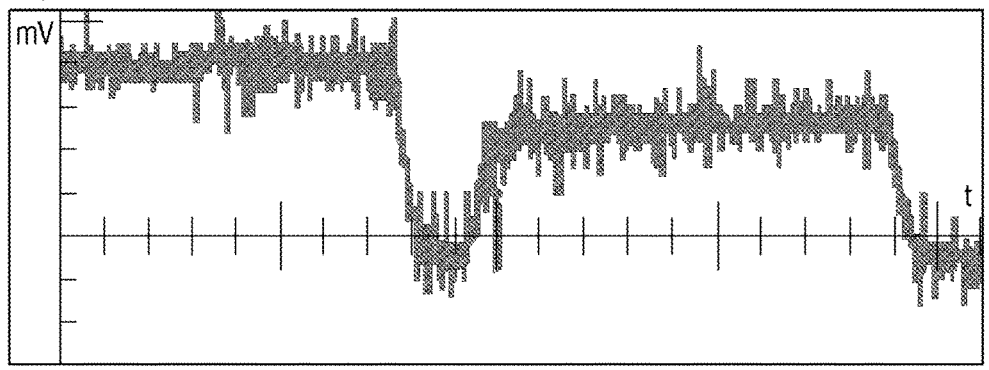
[Fig. 10]
[Fig. 11]
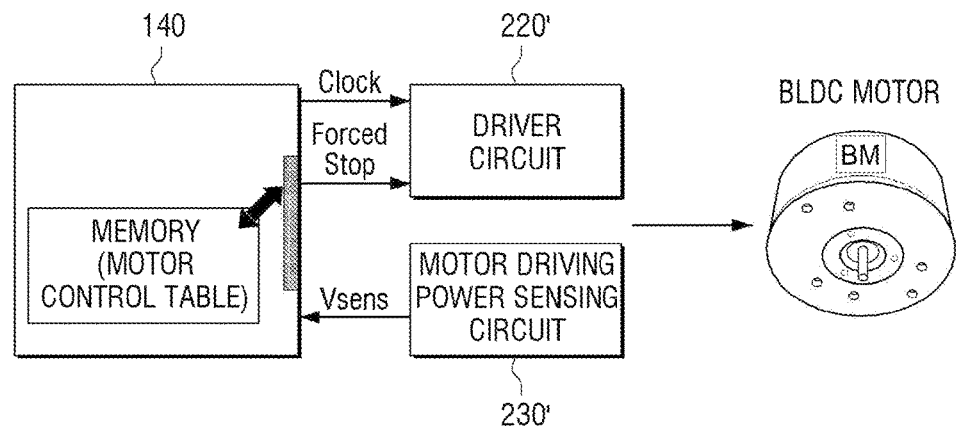
[Fig. 12]
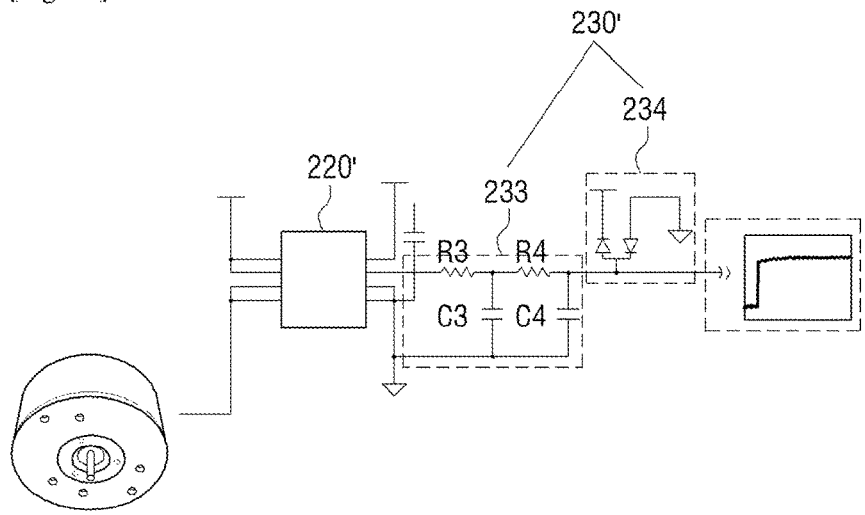

[Fig. 13]
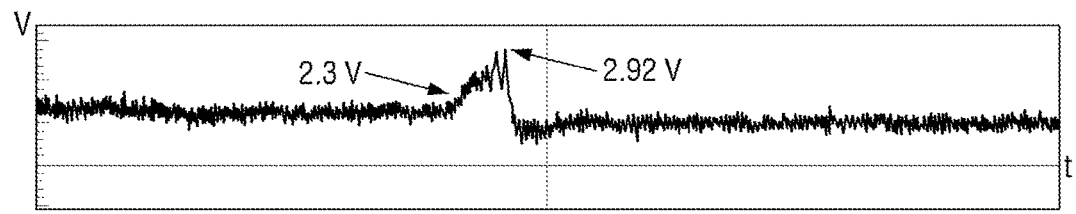
[Fig. 14]
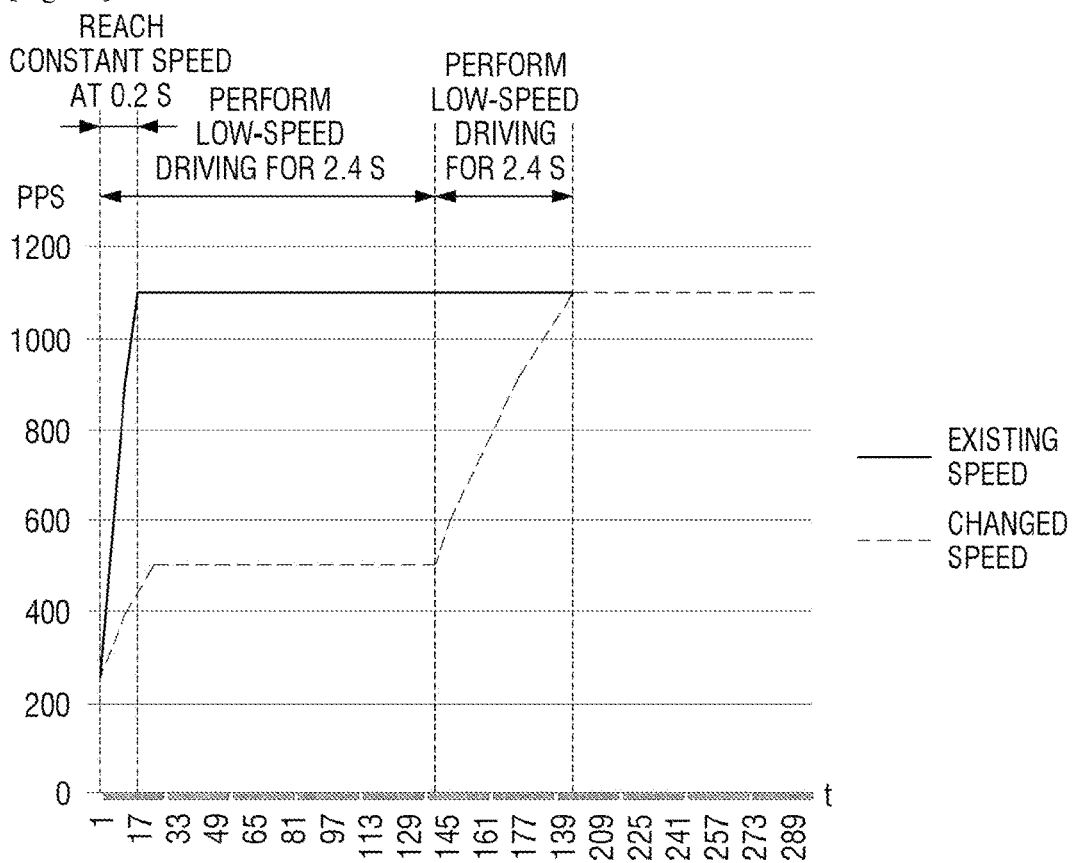
[Fig. 15]
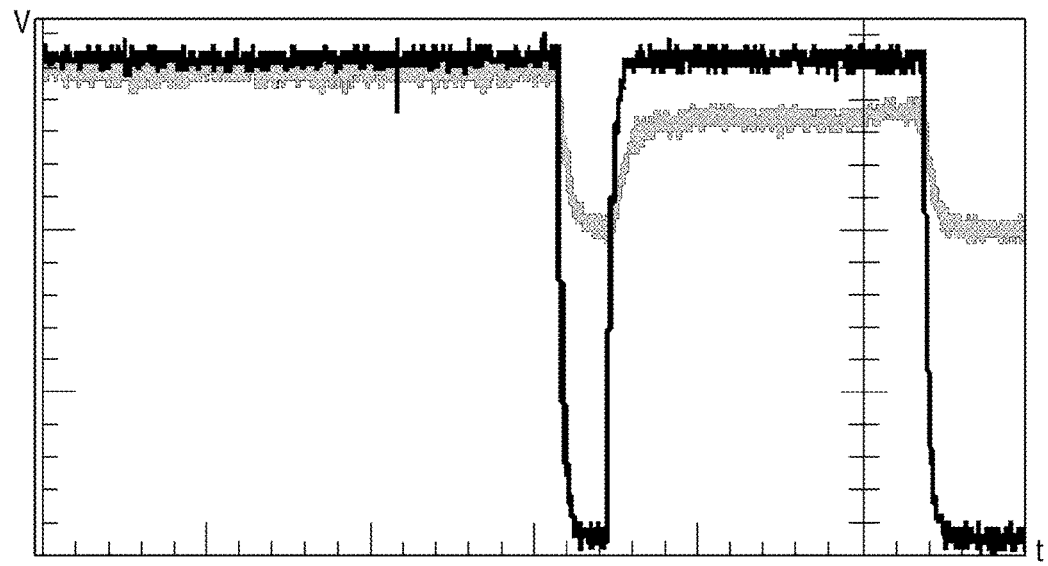

[Fig. 16]
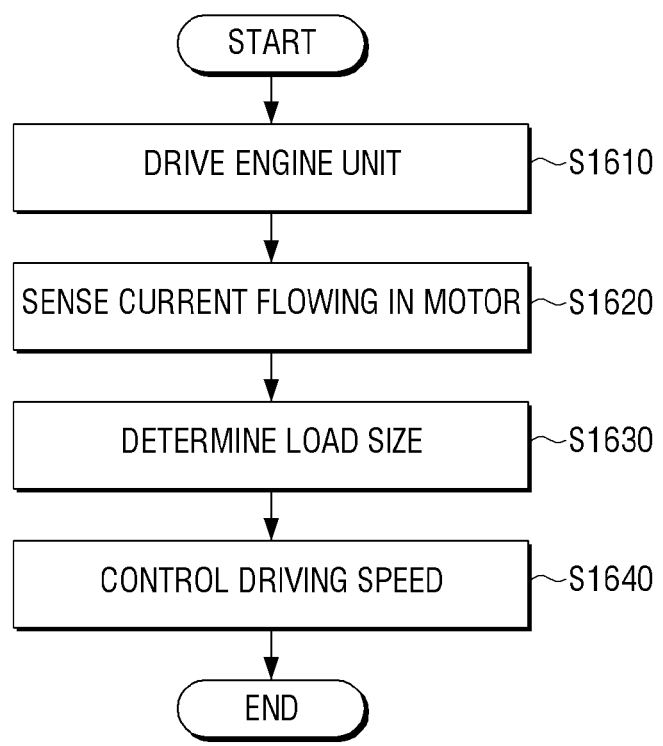

IMAGE FORMING APPARATUS AND IMAGE FORMING METHOD

BACKGROUND ART

An image forming apparatus is an apparatus that performs generating, printing, receiving, transmitting, and the like of image data. Representative examples of an image forming apparatus may include a printer, a copier, a fax machine, a multi-function printer (MFP) that integrates and realizes their functions, and the like.

An image forming apparatus mentioned above uses motors for performing various functions such as moving print paper, feeding print paper, and the like. Also, an option unit that performs various functions may be attached to an image forming apparatus, so that the number of motors that may be used in the image forming apparatus may be increased even further.

A recent image forming apparatus may use a step motor (or a pulse motor, a stepping motor, or the like) in order to precisely control a movement and the like of print paper, or may employ a Brushless Direct Current (DC) (BLDC) motor in order to operate with a low noise.

DISCLOSURE OF INVENTION

Brief Description of Drawings

The above and/or other aspects of the present disclosure will be more apparent by describing certain examples with reference to the accompanying drawings, in which:

FIG. 1 is a block diagram of a simple configuration of an image forming apparatus according to an example;

FIG. 2 is a block diagram of a more detailed configuration of an image forming apparatus according to an example;

FIG. 3 illustrates a configuration of an engine unit of FIG. 1, according to an example;

FIG. 4 illustrates a method of determining a driving speed of a motor according to an example;

FIG. 5 illustrates a more detailed configuration of a driver circuit of FIG. 1 according to an example;

FIG. 6 illustrates a connection relation between a processor and a driver circuit if a motor is a step motor according to an example;

FIG. 7 is a circuit diagram of a driver circuit if a step motor is used according to an example;

FIG. 8 is a voltage waveform diagram at a resistance node of FIG. 7 according to an example;

FIG. 9 is a voltage waveform diagram at an output terminal of a smoothing circuit according to an example;

FIG. 10 is a voltage waveform diagram at an output terminal of an amplifier circuit according to an example FIG. 11 illustrates a connection relation between a processor and a driver circuit if a motor is a Brushless Direct Current (BLDC) motor according to an example;

FIG. 12 is a circuit diagram of a driver circuit if a BLDC motor is used according to an example;

FIGS. 13 and 14 illustrate a method of controlling an operation performed in an initial warming-up process according to an example;

FIG. 15 illustrates an operation performed if a size of a load is changed during a print job according to an example; and FIG. 16 is a flowchart of an image forming method according to an example.

MODE FOR THE INVENTION

Examples of the present disclosure will now be described in greater detail with reference to the accompanying drawings.

In the following description, the same drawing reference numerals are used for the same elements even in different drawings. The matters defined in the description, such as detailed construction and elements, are provided to assist in a comprehensive understanding of the disclosure. Thus, it is apparent that the present disclosure may be carried out without those specifically defined matters. Also, well-known functions or constructions are not described in detail since they would obscure the disclosure with unnecessary detail.

When an element is described as "connected to" another element, this may include a "direct connection" or an "indirect connection" through another element. In addition, unless otherwise defined, when an element "includes" another element, it may mean that the element further includes other elements without excluding the other elements.

An "image forming job" may refer to various types of jobs (e.g., printing, scanning, copying, and faxing jobs) related to an image like forming an image, generating, storing, and transmitting an image file, and the like. Also, a "job" may refer to a meaning including all of an image forming job and a series of processes necessary for performing the image forming job.

In addition, an "image forming apparatus" may refer to an apparatus that prints print data generated in a terminal apparatus, such as a computer, on recording paper. Examples of an image forming apparatus may include a copier, a printer, a fax machine, a multi-function printer (MFP) that complexly realizes their functions through one apparatus, and the like. The image forming apparatus may also refer to any type of apparatus capable of performing an image forming job like a printer, a scanner, a copier, a fax machine, an MFP, a display apparatus, and the like.

Also, a "hard copy" may refer to an operation of outputting an image on a print medium such as paper or the like, and a "soft copy" may refer to an operation of outputting an image on a display apparatus such as a TV, a monitor, or the like.

"Contents" may refer to any kind of data, which are targets of image forming jobs, such as a photo, an image, a document file, and the like.

"Print data" may refer to data which is converted into a format printable by a printer. If a printer supports direct printing, a file may be print data.

A "user" may refer to a person who performs a manipulation related to an image forming job by using an image forming apparatus or a device connected to the image forming apparatus by wire or wirelessly. A "manager" may refer to a person who has a right to access all types of functions of an image forming apparatus and a system. The "manager" and the "user" may be the same person.

FIG. 1 is a block diagram of a simple configuration of an image forming apparatus according to an example.

Referring to FIG. 1, the image forming apparatus 100 includes an engine unit 110, a motor 120, a driver circuit 130, and a processor 140.

Here, the image forming apparatus 100 may be an apparatus that performs generating, printing, receiving, and transmitting of image data, and the like. Examples of the image forming apparatus 100 may include a printer, a copier, a fax machine, a multi-function printer (MFP) that integrates and realizes their functions, and the like. The present example may be applied merely to an image forming apparatus that forms an image but may also be applied to an image scanning apparatus such as a scanner.

The engine unit 110 performs an image forming job. For example, the engine unit 110 may perform an image forming job under control of the processor 140 and according to a starting of the motor 120. The engine unit 110 has been described as performing the image forming job in the present example. However, if the image forming apparatus 100 is a scanner or an MFP capable of performing a scanning job, the engine unit 110 may be an element that performs an image scanning job. A more detailed example of the engine unit 110 will be described later with reference to FIG. 3.

The motor 120 starts the engine unit 100. For example, the motor 120 may be included in the image forming apparatus 100 and may be a Direct Current (DC) motor, a step motor, or a Brushless DC (BLDC) motor. The motor 120 may perform various types of functions of the image forming apparatus 100, such as driving an organic photo conductor (OPC) of the engine unit 110, driving a fuser, transferring paper, and the like.

The driver circuit 130 generates a driving signal of the motor 120 according to a control command. The driver circuit 130 may also sense a current flowing in the motor 120 and supplies the motor 120 with a preset power source. For example, if the motor 120 is a step motor, the driver circuit 130 may receive current size information and speed information, supply the step motor with a constant current in response to the received current size information, and supply the step motor with an impulse driving signal corresponding to the speed information. Also, if the motor 120 is a BLDC motor, the driver circuit 130 may receive speed information, supply the BLDC motor with a preset constant voltage, and supply the BLDC motor with a driving signal corresponding to the received speed information. A more detailed example of the driver circuit 130 and its operation will be described later with reference to FIG. 5.

The processor 140 controls respective elements of the image forming apparatus 100. For example, if the processor 140 receives print data from a print control terminal apparatus, the processor 140 may control an operation of the engine unit 110 so as to print the received print data and transmit a control command of the motor 120 starting the engine unit 110 to the driver circuit 130. For example, the processor 140 may transmit, to the driver circuit 130, a control command of starting and/or stopping, and accelerating and/or decelerating a rotation of the motor 120, a control command of a speed command value of the rotation of the motor 120, a control command of whether a brake operates, or the like.

The processor 140 may also determine a load size of the motor 120 based on the sensed current. For example, the processor 140 may determine the load size of the motor 120 based on a size of a voltage transmitted through an Analog-to-Digital Converter (ADC) port (or terminal).

In addition, the processor 140 may determine a driving speed of the motor 120 based on the determined load size. For example, the processor 140 may determine a print speed of the engine unit 110 in consideration of the determined load size, types of loaded print paper, and an environment in which the image forming apparatus 100 is located. As described above, a load size is determined, and a driving speed is determined based on the determination result. However, a driving speed of the motor 120 may be immediately determined in response to a sensed current size.

The processor 140 may determine the driving speed of the motor 120 of the image forming apparatus 100 by using a lookup table having motor speeds corresponding to a plurality of engine speeds and may control the driver circuit 130 so as to operate the motor 120 in response to the determined driving speed. If a plurality of motors are included in the image forming apparatus 100, the processor 140 may determine speeds and operation times respectively corresponding to the plurality of motors and control the plurality of motors so as to operate according to the speeds and operation times.

The processor 140 may also control the driving speed of the motor 120 based on the determined load size. For example, if the determined load size is smaller than a preset reference load, the processor 140 may control the engine unit 110 and the driver circuit 130 to perform a print job at a first speed corresponding to a preset print speed of the engine unit 110. Also, if the determined load size is larger than the preset reference load, the processor 140 may control the engine unit 110 and the driver circuit 130 to perform the print job at a second speed that is lower than the first speed. Therefore, the motor 120 may operate at a driving speed corresponding to a determined speed. Controlling such a driving speed may be performed on the basis of every print job or on the basis of every print page.

If the motor 120 to be controlled is a step motor, the processor 140 may control the driver circuit 130 to supply the step motor with a constant current corresponding to the determined load size. For example, the processor 140 may supply the driver circuit 130 with a current reference value Vref (hereinafter referred to as a constant current control value) so as to supply the step motor with a constant current corresponding to the determined load size. Here, the constant current control value may be a Pulse Width Modulation (PWM) signal form.

If the motor 120 to be controlled is a step motor, the processor 140 may control the driver circuit 130 to determine a phase output method corresponding to the determined load size and operate the step motor according to the determined phase output method.

If the motor 120 to be controlled includes a brake member, the processor 140 may determine whether to use the brake member in response to the determined load size and selectively control an operation of the brake member at a time requiring stopping of the motor 120 according to the determination result.

The processor 140 may also receive load information of the motor 120 from the driver circuit 130 and determine whether the motor 120 operates normally, based on the received load information. In addition, if it is determined that the motor 120 operates abnormally, the processor 140 may control a display to display a warning message. The processor 140 has been described above as determining whether the motor 120 operates normally. However, the driver circuit 130 may determine whether the motor 120 operates normally and, if the motor 120 operates abnormally, transmit a message of the abnormal operation of the motor 120 to the processor 140.

The driver circuit 130 has been described above as directly measuring a load size. However, the driver circuit 130 may measure a current flowing in the motor 120 and transmit information corresponding to the measured current to the processor 140.

As described above, the image forming apparatus 100 may control a speed of the motor 120 according to load information of the motor 120 and thus stably perform a print job. Since the image forming apparatus 100 also varies a constant current supplied to the motor 120 according to the load information of the motor 120, the image forming apparatus 100 may perform an efficient control of the motor 120 and determine whether the motor 120 operates normally and/or abnormally, based on the sensed load information.

As described above with reference to FIG. 1, the motor 120 and the driver circuit 130 are individual elements, but the motor 120 may be realized as an element of the driver circuit 130. Also, as described above, the driver circuit 130 senses the current flowing in the motor 120, and the processor 140 determines a load degree. However, the driver circuit 130 may determine the load degree and provide the processor 140 with the determination result.

An example of the image forming apparatus 100 has been described above, but the image forming apparatus 100 may additionally include various types of elements. This will now be described with reference to FIG. 2.

FIG. 2 is a block diagram of a more detailed configuration of an image forming apparatus according to an example.

Referring to FIG. 2, the image forming apparatus 100 may include the engine unit 110, the motor 120, the driver circuit 130, the processor 140, a communication interface unit 150, a display 160, a manipulation input unit 170, and a storage unit 180.

The engine unit 110, the motor 120, the driver circuit 130, and the processor 140 may perform the same functions as the engine unit 110, the motor 120, the driver circuit 130, and the processor 140 of FIG. 1, and thus their repeated descriptions are omitted herein.

The communication interface unit 150 is connected to a print control terminal apparatus (not shown) and may receive print data from the print control terminal apparatus. For example, the communication interface unit 150 may be formed to connect the image forming apparatus 100 to an external apparatus and may be connected to a terminal apparatus through a Local Area Network (LAN) and an internet network or through a Universal Serial Bus (USB) port or a wireless communication (e.g., Wireless Fidelity (WiFi) 802.11a/b/g/n, Near Field Communication (NFC), Bluetooth, etc.) port. Here, the print control terminal apparatus may be a normal Personal Computer (PC), a notebook computer, or a mobile device such as a smartphone.

The communication interface unit 150 may receive the print data from the print control terminal apparatus. In addition, if the image forming apparatus 100 has a scanner function, the communication interface unit 150 may transmit generated scan data to the print control terminal apparatus or an external server (not shown).

The display 160 may display various types of information provided in the image forming apparatus 100. For example, the display 160 may display an operation state of the image forming apparatus 100 or may display a user interface window for selecting a function and an option selectable by a user. The display 160 may be a monitor such as a Liquid Crystal Display (LCD), a Cathode Ray Tube (CRT), or the like or may be realized as a touch screen capable of simultaneously performing a function of the manipulation input unit 170 that will be described later.

The display 160 may also display the operation state of the image forming apparatus 100. For example, the display 160 may display whether a step motor to be described later operates normally. For example, the display 160 may display information about overload, step-out, or the like of the motor 120 to the user.

The manipulation input unit 170 may include a plurality of function keys through which the user may set or select various types of functions supported in the image forming apparatus 100. The manipulation input unit 170 may be realized as a device such as a mouse, a keyboard, or the like or may be realized as a touch screen capable of simultaneously performing functions of the display 160 described above. This may enable the user to input various types of control commands of the image forming apparatus 100.

Also, if the image forming apparatus 100 includes a plurality of paper loading trays, the manipulation input unit 170 may receive a selection of a paper loading tray that is to be used for a print job. Alternatively, the manipulation input unit 170 may receive various types of information related to print paper on which a print job will be performed. Here, the various types of information related to the print paper may include a paper size, coated or uncoated, thickness information, and the like.

The storage unit 180 may store print data. For example, the storage unit 180 may store the print data received from the communication interface unit 150 described above. The storage unit 180 may be realized as a storage medium of the image forming apparatus 100, an external storage medium, a removable disk including a USB memory, a web server through a network, or the like.

The storage unit 180 may also store a lookup table for controlling the motor 120. Here, the lookup table may be an acceleration table having pulse period information of each driving speed of a step motor, a speed (or acceleration) table corresponding to a plurality of load voltages Vload, a lookup table of torque values corresponding to the plurality of load voltages Vload, or a lookup table of constant current values (Vref values or control voltage values) corresponding to the plurality of load voltages Vload. Also, the lookup table may include constant current control values, speed control values, and phase state values corresponding to a plurality of loads, a plurality of environments, and a plurality of paper types. In addition, the lookup table may include constant current control values and speed control values corresponding to a plurality of loads and a plurality of phase states.

The storage unit 180 may store load information of the step motor 120. For example, the storage unit 180 may store load information transmitted from a motor control device 200.

The storage unit 180 has been described as storing a lookup table in the present example, but the lookup table may be stored in the driver circuit 130 or the processor 140 that will be described later.

As described above, the image forming apparatus 100 may control a speed and a constant current appropriate for a product environment by determining a load of the motor 120 in real time. The image forming apparatus 100 may also inform the user whether to replace a product before a malfunction of the product occurs by sensing one or more abnormalities of the product. In addition, the image forming apparatus 100 may variously store a motor control table by being combined with print paper set by the user and thus perform a motor control appropriate for a user environment.

FIG. 3 illustrates a configuration of an engine unit of FIG. 1, according to an example.

Referring to FIG. 3, the engine unit 110 may include a photosensitive drum 111, a charger 112, an exposure unit 113, a developing unit 114, a transfer unit 115, and a fuser 118.

The engine unit 110 may further include a feeding means (not shown) that feeds a recording medium P. An electrostatic latent image is formed on the photosensitive drum 111. The photosensitive drum 111 may be referred to as a photosensitive drum, a photosensitive belt, or the like according to a shape thereof.

Hereinafter, for convenience of description, elements of the engine unit 110 corresponding to one color will be described. However, the engine unit 110 may include a plurality of photosensitive drums 111, a plurality of chargers 112, a plurality of exposure units 113, and a plurality of developing units 114 corresponding to a plurality of colors, and an intermediate transfer belt.

The charger 112 charges a surface of the photosensitive drum 111 with a uniform potential. The charger 112 may be realized as a type such as a corona charger, a charging roller, a charging brush, or the like.

The exposure unit 113 forms the electrostatic latent image on the surface of the photosensitive drum 111 by changing a surface potential of the photosensitive drum 111 according to image information that is to be printed. For example, the exposure unit 113 may form the electrostatic latent image by irradiating modulated light onto the photosensitive drum 111 according to the image information that is to be printed. The exposure unit 113 having this type may be referred to as a photoscanner and use a Light Emitting Diode (LED) as a light source.

The developing unit 114 houses a developer therein and develops the electrostatic latent image as a visible image by supplying the electrostatic latent image with the developer. The developing unit 114 may include a developing roller 117 that supplies the electrostatic latent image with the developer. For example, the developer may be supplied from the developing roller 117 to the electrostatic latent image formed on the photosensitive drum 111 through a developing electric field formed between the developing roller 117 and the photosensitive drum 111.

The visible image formed on the photosensitive drum 111 is transferred onto the recording medium P by the transfer unit 115 or the intermediate transfer belt (not shown). The transfer unit 115 may transfer the visible image onto the recording medium P according to an electrostatic transfer method. The visible image may stick onto the recording medium P by an electrostatic attraction.

The fuser 118 fuses the visible image on the recording medium P by applying heat and/or pressure to the visible image on the recording medium P. A print job is completed through a series of processes described above.

The developer described above is used whenever an image forming job is performed and thus is exhausted if being used for a preset time or more. In this case, a unit (e.g., the developing unit 114 described above) that stores the developer may be newly replaced. Parts or elements that may be replaced in a process of using the image forming apparatus 100 as described above may be referred to as consumable units or replaceable units. Also, a memory (or a Customer Replaceable Unit Monitoring(CRUM chip) may be attached to such a consumable unit in order to appropriately manage the corresponding consumable unit.

The motor 120 may perform an operation of rotating the respective elements of the engine unit 110 described above. One motor 120 may simultaneously rotate a plurality of elements of the engine unit 110 described above or a plurality of motors may be combined to rotate the plurality of elements described above.

FIG. 4 illustrates a method of determining a driving speed of a motor according to an example.

Referring to FIG. 4, an operation, such as a printing operation, is started in operation S410. Upon starting of the operation, a type of loaded manuscript may be determined. For example, a determination may be made in operation S415 as to whether the manuscript is thick paper causing a high load. If it is determined that the manuscript is not thick paper in operation S415, the paper is set to thin paper in operation S435. In operation S415, the determination may be made based on a type of manuscript set by the user. If the manuscript is the thick paper according to the determination result, the motor may be determined as operating in a first motor condition without an additional determination operation in operation S430. Similarly, if the manuscript is the thin paper, the motor may be determined as operating in a second motor condition without an additional determination operation in operation S450.

However, an environment determination and a load state sensing may each also be performed.

In operations S420 and S440, an environment in which an image forming apparatus is located is determined. For example, a determination may be made as to whether the environment is a high temperature environment (e.g., 30° C. or above) and high humidity environment (e.g., 80% relative humidity or above) or a low temperature and dry environment, based on temperature and humidity states. If the image forming apparatus does not include a sensor capable of checking temperature and humidity as mentioned above, the corresponding environment determination operation may be omitted. Operations S420 and S440 are shown using dashed lines to illustrate their optional status.

In operations S425 and S445, a load state of the motor is sensed in a warming-up process. For example, if a request for a print job is input from a print control terminal apparatus (not shown), the motor performs warming-up driving for printing the manuscript at a preset print speed before the print job. Here, a motor control method may be determined based on the load state of the motor sensed in the warming-up process. If the image forming apparatus does not include a sensor capable of determining a motor load as mentioned above, the corresponding motor load determination operation may be omitted. Operations S425 and S445 are shown using dashed lines to illustrate their optional status.

A determination may be made as to whether the motor is required to operate in a high load state (e.g., Motor Control 1) or a low load state (e.g., Motor Control 2), based on three factors (e.g., a print paper type, an environment, and a motor load) as described above. Alternatively, a determination may be made as to whether the motor is required to operate in either a high load state or a low load state based on a single factor, such as a manuscript thickness.

Also, the processor 140 may change at least one selected from a speed, a constant current, and a phase state of the motor according to the determined load state.

For example, if a speed of the motor is a first reference speed in the low load state, the motor may be controlled to operate at a second speed lower than the first speed in the high load state. Here, the constant current and the phase state may be the same as the low load state and may also be changed if necessary.

If the motor operates at a first constant current in the low load state, the motor may be controlled to operate at a second constant current higher than the first constant current in the high load state. Here, the speed and the phase state of the motor may be the same as the low load state and may also be changed if necessary.

Also, if the step motor operates in 2 phases in the low load state, the step motor may be controlled to operate in 1-2 phases in the high load state. Here, the speed and the constant current of the motor may be the same as the low load state and may also be changed if necessary.

In the above description, a determination is made as to whether the motor operates in a high load state or a low load state, and a speed, a constant current, and a phase state of the motor are changed according to the determination result. However, a size of the speed and a size of the constant current may be controlled in phases or linearly so as to be adapted to an arithmetical size of a load.

The change in the phase state described above may be applied if a step motor is controlled and may not be applied to another motor.

For example, the step motor has different characteristics depending on phase output methods. The characteristics depending on the phase output methods are as shown in Table 1 below.

TABLE 1

| Classification | Step | Characteristic | Condition Example |
|---|---|---|---|
| 2 Phases | Full Step | Speed ↑ Current ↓ | Normal Paper/ Room Temperature/ Vsens: 2.0 V↓ |
| 1-2 Phases | Half Step | Speed ↓ Current ↑ | Thick Paper/ Low Temperature/ Vsens: 2.0 V↑ |

Here, 2 phases and 1-2 phases are phase output methods that are mainly used for the step motor, and the phase output methods may change phase outputs based on paper settings, temperature and humidity environments, or sensed load sizes input by the user. For example, the step motor may be controlled so as to operate in 1-2 phases on thick paper causing a high load or in a low temperature state. On the contrary, the step motor may be controlled so as to operate in 2 phases on normal paper causing a relatively low load and in a room temperature.

A phase output described above may continue during one print job or may be changed during a print job. For example, if a high load is sensed during initial warm-up driving (i.e., for several seconds after initial driving), a 1-2 phase control may be performed by changing a phase output after pausing the initial warm-up driving. If the speed of the motor decreases according to the 1-2 phase control, an operation of slightly increasing a speed sensed after initial driving by changing a speed of a pulse frequency may be performed.

FIG. 5 illustrates a more detailed configuration of a driver circuit of FIG. 1 according to an example.

Referring to FIG. 5, the image forming apparatus 100 includes a plurality of motors 120-1, 120-2, and 120-3 and the motor control device 200. Here, the motor control device 200 is an element corresponding to the driver circuit 130 of FIG. 1. However, while the processor 140 may perform an operation such as sensing a size of a load or the like in the description of FIG. 1, the motor control device 200 of FIG. 5 is a device that performs some operations of the processor 140 of FIG. 1 together. The motor control device 200 that will be described hereinafter may be included in the image forming apparatus 100 or may be a device that is constituted separately from the image forming apparatus 100.

The plurality of motors 120-1, 120-2, and 120-3 may be the same type or different types of motors, and each of the plurality of motors 120-1, 120-2, and 120-3 may be a step motor, a BLDC motor, or a DC motor. In other words, the motor control device 200 may be realized as a type that generates a driving signal of the step motor and performs controls of the BLDC motor and the DC motor.

The motor control device 200 controls the plurality of motors 120-1, 120-2, and 120-3. For example, the motor control device 200 may include a plurality of drivers and a driver processor.

The motor control device 200 may respectively receive control commands of the plurality of motors 120-1, 120-2, and 120-3, respectively measure load sizes of the plurality of motors 120-1, 120-2, and 120-3, and control the plurality of drivers so as to supply constant currents corresponding to the measured load sizes.

A driver 210 may supply a constant current flowing in the motor 120. For example, the driver 210 may supply a step motor with a preset constant current based on a driving signal and a current reference value Vref (hereinafter referred to as a constant current control value) transmitted from a driver processor 250.

A sensor 230 may measure the current flowing in the motor 120. The sensor 230 may be implemented having a different type according to a type of a motor that is controlled. For example, if the motor 120 is a step motor, the sensor 230 may sense a voltage value of a resistor that is connected to a coil of the step motor in series. Also, if the motor 120 is a BLDC motor, the sensor 230 may sense a current input into a power input unit of the BLDC motor.

Here, the sensor 230 may include a smoothing circuit that smooths the voltage value of the resistor and an amplifier circuit that amplifies the smoothed voltage value. An output value of the amplifier circuit is a sensing voltage value Vsens and may be supplied to an ADC terminal of the driver processor 250 or the processor 140.

The driver processor 250 may receive a control command from the processor 140 and control a driving state of the motor 120 by controlling the driver 210 based on the received control command. For example, the driver processor 250 may receive a control command of the motor 120 from the processor 140. Here, the control command may include a control command of starting and/or stopping and accelerating and/or decelerating a rotation of the step motor, a control command of a speed command value of the rotation of the step motor, a control command of whether a brake operates, or the like.

The control command may be received from the processor 140 through a Serial Peripheral Interface (SPI) that is an interface enabling two apparatuses to exchange data through a serial communication and a serial communication interface such as inter-integrated circuit ($I^2C$) that is a bidirectional serial bus.

Also, the driver processor 250 may generate a driving signal of the motor 120 according to the received control command. For example, the driver processor 250 may generate a driving signal by using pulse period information of a speed change section corresponding to a control command of an acceleration table when controlling the step motor. Here, the acceleration table may be a table including pulse period information of each driving speed of the step motor, may be autonomously stored in the driver processor 250, or may be stored in the storage unit 180, and read and used by the driver processor 250.

Here, the driver processor 250 may generate the driving signal by using an acceleration table corresponding to a load size of the motor 120. Also, if a phase change of the step motor is required, the driver processor 250 may generate the driving signal by using an acceleration table corresponding to a current phase state and a determined load size. If the current phase state of the step motor is not a phase state corresponding to a load size, the driver processor 250 may vary a driving method of the driver 210 so as to enable the step motor to have a phase state corresponding to the load size.

When generating the driving signal, the driver processor 250 may determine a load size of the motor 120 and control the driver 210 to supply the step motor with a constant current corresponding to the determined load size.

For example, the driver processor 250 may determine a size of a constant current that will be supplied to the motor 120 based on the determined load size. As another example, the driver processor 250 may determine a size of a constant current corresponding to a calculated load size through a calculation method or by using a pre-stored lookup table. A size of a constant current determined by this method may be an addition of a preset margin current to a necessary constant current of the calculated load size.

The driver processor 250 may perform a high and/or low limit control with respect to the calculated load size. For example, the driver processor 250 may store a preset constant current value, a preset first load size value, and a preset second load size value. If the calculated load size is larger than the preset first load size value, the driver processor 250 may increase the preset constant current value, the preset first load size value, and the preset second load size value and determine the increased constant current value as a constant current corresponding to the calculated load size. If the calculated load size is smaller than the preset second load size value, the driver processor 250 may decrease the preset constant current value, the preset first load size value, and the preset second load size value, and determine the decreased constant current value as a constant current corresponding to the calculated load size.

Also, the driver processor 250 may supply the processor 140 with the measured load size. In addition, the driver processor 250 may determine whether the step motor operates normally by comparing the measured load size with pre-stored load size information measured during normal driving.

As described above, the driver control device 200 may sense a load state of the motor 120 in real time. Therefore, the driver control device 200 may control a speed of the motor 120 and a constant current supplied to the motor 120 in real time.

The motor control device 200 does not include the motor 120 in the illustrated example but may be realized as a type including the motor 120 as an element.

The driver 210 and the driver processor 250 are illustrated and described as separate elements in the description of FIG. 5 but may be realized as one element.

FIG. 6 illustrates a connection relation between a processor and a driver circuit if a motor is a step motor according to an example. FIG. 7 is a circuit diagram of a driver circuit if a step motor is used according to an example.

Referring to FIG. 6, if the motor 120 is a step motor, the processor 140 supplies the driver circuit 130 with a constant current control value Vref and a pulse value corresponding to a driving speed and receives a voltage value Vsens corresponding to a current value flowing in the step motor from the driver circuit 130.

Referring to FIG. 7, the driver processor 250 may include an MS terminal, and the processor 140 may vary a phase state of the step motor through the MS terminal.

The sensor 230 may smooth a voltage value corresponding to a resistor measuring a current flowing in a coil of the motor 120 by using a smoothing circuit 231. For example, the sensor 230 may use a Resistor-Capacitor (RC) smoothing circuit including a plurality of resistors (R1, R2) and a plurality of capacitors (C1, C2). As an example, the RC smoothing circuit may be realized by connecting two RC circuits in series. However, one RC smoothing circuit may be used or may be realized as another smoothing circuit not another RC circuit.

Also, the smoothed voltage value may be amplified by using an amplifier circuit 232.

FIG. 8 is a voltage waveform diagram at a resistance node of FIG. 7 according to an example. FIG. 9 is a voltage waveform diagram at an output terminal of a smoothing circuit according to an example. FIG. 10 is a voltage waveform diagram at an output terminal of an amplifier circuit according to an example.

Referring to FIG. 8, a voltage in a resistor connected to a coil in series does not output a stable value. Therefore, the voltage value of the resistor may be smoothed by using an additional smoothing circuit. An example of the smoothed voltage value is as shown in FIG. 9.

Since the smoothed voltage value is not appropriate for an ADC level of a Central Processing Unit (CPU), the smoothed voltage value may be amplified by using an amplifier circuit that performs amplifying at a preset ratio. An example of the amplified voltage value is as shown in FIG. 10.

A voltage value output through a circuit as described above may be input into an ADC port of the processor 140, and the processor 140 may monitor changes in a load in real time.

A size of a load and a voltage value of a resistor may have linear characteristics, and the processor 140 may sense a load in real time due to the linear characteristics. Also, the processor 140 may perform a driving control in real time based on the load size sensed in real time.

FIG. 11 illustrates a connection relation between a processor and a driver circuit if a motor is a BLDC motor according to an example. FIG. 12 is a circuit diagram of a driver circuit if a BLDC motor is used according to an example.

Referring to FIG. 11, the driver circuit may include a driver circuit 220' and a sensor circuit 230' for controlling the BLDC motor.

The processor 140 may supply the driver circuit 220' with a clock signal Clock for controlling a speed of the motor 120 and a forced stop signal for operating a brake member (BM) of the BLDC motor.

The processor 140 also receives the voltage value Vsens corresponding to the load size from the sensor circuit 230'.

Referring to FIG. 12, the sensor circuit 230' may smooth a voltage value of a resistor sensing a current flowing in a power input unit of the BLDC motor by using a smoothing circuit 233. For example, the sensor circuit 230' may use an RC smoothing circuit including a plurality of resistors (R3, R4) and a plurality of capacitors (C3, C4). The sensor circuit 230' may smooth the voltage value of the resistor by using another type of smoothing circuit besides the RC smoothing circuit.

The smoothed voltage value may be amplified by using an amplifier circuit 234.

The BLDC motor generally includes a brake member differently from a step motor. Therefore, the processor 140 may selectively control whether to use the brake member according to a load state. For example, when requiring to stop the BLDC motor, a long time is taken to stop the BLDC motor in a low load state, and thus the brake member is used. Since a short time is taken to stop the BLDC motor in a high load state, the BLDC motor may be stopped without using the brake member.

According to an existing technology, since a load is not monitored in real time, a motor is controlled merely in an initially set state. However, according to an example, a brake control may be selectively performed according to a size of a load.

FIGS. 13 and 14 illustrate a method of controlling an operation performed in an initial warming-up process according to an example.

Referring to FIGS. 13 and 14, an initial warming-up time of an image forming apparatus is different according to each apparatus but is mainly a several second level.

Therefore, if a measured value of a load input during warming-up is sensed to a preset value or more, a soft start control may be performed. Here, the soft start is not to control a motor so as to reach a target speed at once but is to control the motor so as to have a first speed in phases and to finally reach a normal speed.

For example, according to a waveform as shown in FIG. 13, a load is checked as being slightly high as 2.92V during initial warming-up. Therefore, as shown in FIG. 14, low-speed driving is performed at a low speed of 500 pps in an initial stage, and then, if a load size is checked as being lowered, normal driving may be performed at a normal speed of 1100 pps.

FIG. 15 illustrates an operation performed if a size of a load is changed during a print job according to an example.

Since a load of a motor is not determined in real time according to an existing technology, a value Vref for controlling a constant current is maintained during driving of the motor. Therefore, the motor is actually supplied with a high current even in a low load state, thereby causing unnecessary power consumption.

However, according to an example, a load of a motor is determined in real time, thereby varying a constant current adaptively supplied to the motor in a sensed load state.

Referring to FIG. 15, since a size of a load is slightly higher in initial driving, the size of the load may be set to be slightly high (e.g., Vref 80%). Thereafter, if it is checked that the size of the load decreases, the size of the load may be controlled to be lower (e.g., Vref 60%). Here, a pulse value related to a speed may be maintained as it is.

FIG. 16 is a flowchart of an image forming method according to an example.

Referring to FIG. 16, an engine unit used for performing an image forming job is driven by using a motor in operation S1610.

In operation S1620, a current flowing in the motor is sensed. For example, if the motor is a step motor, the current flowing in the motor may be sensed based on a voltage value of a resistor for sensing a current flowing in a coil. If the motor is a BLDC motor, a current flowing at a constant voltage 24V supplied to a voltage input unit of the BLDC motor may be sensed by using a current sensor circuit.

In operation S1630, a load size of the motor is determined based on the sensed current. For example, the load size of the motor may be determined based on a size of a voltage input into an ADC terminal of a processor.

In operation S1640, a driving speed of the motor is controlled based on the determined load size. For example, if the determined load size is smaller than a preset reference load, the driving speed of the motor may be controlled so as to have a first speed corresponding to a preset print speed of the engine unit. If the determined load size is larger than the preset reference load, the driving speed of the motor may be controlled so as to have a second speed lower than the first speed. Also, if a load size, which is determined while the motor operates at the second speed, becomes smaller than the preset reference load, the driving speed of the motor may be controlled so as to have the first speed.

Even if the motor is a step motor, a constant current corresponding to the determined load size may be supplied to the motor. Also, the step motor may be controlled so as to operate according to a phase output method corresponding to the determined load size.

If the motor is a BLDC motor having a brake member, and driving of the motor is required to be stopped, the brake member of the motor may selectively operate.

Also, a determination may be made as to whether the motor operates normally by comparing the determined load size with pre-stored load size information determined during normal driving.

As described above, the image forming method may control a speed and a constant current appropriate for a product environment by determining a load of a motor in real time. Also, the image forming method may inform a user whether a product should be replaced before the product malfunctions by sensing a repeated abnormal phenomenon. In addition, since a motor control table may be variously stored through a combination with print paper set by the user, a motor control appropriate for a user environment may be performed. The image forming method as described with reference to FIG. 16 may be executed on the image forming apparatus 100 having the configuration of FIG. 1 or 2 or may be executed on other types of image forming apparatuses or motor control devices having other types of configurations.

Also, an image forming method as described above may be embodied as at least one execution program for executing the image forming method, and the execution program may be stored on a non-transitory computer readable medium.

The non-transitory computer readable medium may be a medium which does not store data temporarily such as a register, cache, and memory but stores data semi-permanently and is readable by devices. More specifically, the aforementioned applications or programs may be stored in the non-transitory computer readable media such as compact disks (CDs), digital video disks (DVDs), hard disks, Blu-ray disks, USBs, memory cards, and read-only memory (ROM).

The foregoing examples and advantages are not to be construed as limiting the present disclosure. Rather, the present teaching can be readily applied to other types of apparatuses. Also, the description of the above examples is intended to be illustrative, and not to limit the scope of the claims, and many alternatives, modifications, and variations will be apparent to those skilled in the art.

The invention claimed is:

1. An image forming apparatus comprising:
   an engine unit to perform an image forming job;
   a motor to drive the engine unit;
   a driver circuit to sense a current flowing in the motor and supply the motor with a power source; and
   a processor to:
      determine a load size of the motor based on the sensed current,
      control a driving speed of the motor to have a first speed corresponding to a preset print speed of the engine unit in response to the determined load size being smaller than a preset reference load, and
      control the driving speed of the motor to have a second speed lower than the first speed in response to the determined load size being larger than the preset reference load.

2. The image forming apparatus of claim 1, wherein, in response to the determined load size becoming smaller than the preset reference load while the motor operates at the second speed, the processor is to control the driving speed of the motor to have the first speed.

3. The image forming apparatus of claim 1, wherein the processor is to control the driver circuit to supply a constant current corresponding to the determined load size.

4. The image forming apparatus of claim 1,
wherein the motor comprises a step motor that is operable according to a plurality of phase output methods, and
wherein the processor is to control the driver circuit to operate the step motor according to a phase output method corresponding to the determined load size.

5. The image forming apparatus of claim 1, wherein the processor is further to control the driving speed of the motor based on at least one of a print paper type or information about an environment in which the image forming apparatus is located.

6. The image forming apparatus of claim 1,
wherein the motor comprises a brake member to stop driving according to an external control signal, and
wherein, in response to driving of the motor being stopped, the processor is to selectively operate the brake member of the motor based on the determined load size.

7. The image forming apparatus of claim 1, wherein the driver circuit comprises:
a resistor to sense the current flowing in the motor;
a smoothing circuit to smooth a voltage value of the resistor;
an amplifier circuit to amplify the smoothed voltage value; and
a driver to supply the motor with a constant current and drive the motor based on a speed control value provided by the processor.

8. The image forming apparatus of claim 7, wherein the amplifier circuit supplies an Analog-to-Digital Converter (ADC) terminal of the processor with the amplified voltage value.

9. The image forming apparatus of claim 1, wherein the processor is to determine a speed of the motor corresponding to the determined load size by using a lookup table having speed sizes corresponding to a plurality of load sizes.

10. The image forming apparatus of claim 1, wherein the processor is to determine whether the motor operates normally by comparing the determined load size with pre-stored load size information determined during normal driving.

11. The image forming apparatus of claim 1, further comprising a plurality of motors and a plurality of driver circuits,
wherein the processor is to:
measure load sizes of the plurality of motors,
determine driving speeds of the engine unit corresponding to the measured load sizes, and
respectively control the plurality of driver circuits in response to the determined driving speeds.

12. The image forming apparatus of claim 11, wherein the processor is to respectively control the plurality of driver circuits to supply a constant current corresponding to the measured load size.

13. An image forming method comprising:
driving an engine unit to perform an image forming job, by using a motor;
sensing a current flowing in the motor;
determining a load size of the motor based on the sensed current;
in response to the determined load size being smaller than a preset reference load, controlling a driving speed of the motor to have a first speed corresponding to a preset print speed of the engine unit; and
in response to the determined load size being larger than the preset reference load, controlling the driving speed of the motor to have a second speed lower than the first speed.

14. The image forming method of claim 13, wherein the controlling of the driving speed comprises, in response to the determined load size becoming smaller than the preset reference load while the motor operates at the second speed, controlling the driving speed of the motor to have the first speed.

15. The image forming method of claim 13, further comprising:
supplying the motor with a constant current corresponding to the determined load size.

16. The image forming method of claim 13,
wherein the motor comprises a step motor that is operable according to a plurality of phase output methods, and
wherein the image forming method further comprises controlling the step motor to operate according to a phase output method corresponding to the determined load size.

17. The image forming method of claim 13,
wherein the motor comprises a brake member to stop driving according to an external control signal, and
wherein the image forming method further comprises, in response to driving of the motor being stopped, selectively operating the brake member of the motor based on the determined load size.

18. The image forming method of claim 13, further comprising:
determining whether the motor operates normally by comparing the determined load size with pre-stored load size information determined during normal driving.

* * * * *